(12) United States Patent
Kawaguchi

(10) Patent No.: US 11,794,330 B2
(45) Date of Patent: Oct. 24, 2023

(54) HAMMER

(71) Applicant: TOKUYAMA CORPORATION, Yamaguchi (JP)

(72) Inventor: Kazuhiro Kawaguchi, Yamaguchi (JP)

(73) Assignee: TOKUYAMA CORPORATION

( * ) Notice: Subject to any disclaimer, the term of this patent is extended or adjusted under 35 U.S.C. 154(b) by 571 days.

(21) Appl. No.: 16/970,289

(22) PCT Filed: Feb. 20, 2019

(86) PCT No.: PCT/JP2019/006403
§ 371 (c)(1),
(2) Date: Aug. 14, 2020

(87) PCT Pub. No.: WO2019/167767
PCT Pub. Date: Sep. 6, 2019

(65) Prior Publication Data
US 2021/0078155 A1   Mar. 18, 2021

(30) Foreign Application Priority Data
Feb. 27, 2018   (JP) ................................ 2018-033561

(51) Int. Cl.
| | | |
|---|---|---|
| B25G 1/10 | (2006.01) | |
| B25D 1/00 | (2006.01) | |
| B25G 1/02 | (2006.01) | |
| B28D 5/00 | (2006.01) | |
| C01B 33/035 | (2006.01) | |
| B25G 3/30 | (2006.01) | |

(52) U.S. Cl.
CPC ................. *B25G 1/10* (2013.01); *B25D 1/00* (2013.01); *B25G 1/02* (2013.01); *B28D 5/0005* (2013.01); *C01B 33/035* (2013.01); *B25G 3/30* (2013.01)

(58) Field of Classification Search
None
See application file for complete search history.

(56) References Cited

U.S. PATENT DOCUMENTS

| | | | | |
|---|---|---|---|---|
| 4,188,703 | A | * | 2/1980 | Fish ......................... B25G 3/14 81/22 |
| 6,016,722 | A | | 1/2000 | Gierer et al. |
| 6,128,977 | A | | 10/2000 | Gierer et al. |

(Continued)

FOREIGN PATENT DOCUMENTS

| | | |
|---|---|---|
| CN | 87206246 U | 11/1987 |
| CN | 2049175 U | 12/1989 |

(Continued)

OTHER PUBLICATIONS

MatWeb Polypropylene properties, found at https://www.matweb.com/search/DataSheet.aspx?MatGUID=08fb0f47ef7e454fbf7092517b2264b2&ckck=1 (Year: 2023).*

(Continued)

*Primary Examiner* — David B. Thomas
(74) *Attorney, Agent, or Firm* — CASIMIR JONES, SC; Brian F. Bradley

(57) ABSTRACT

A hammer (1) for use in shape processing of a silicon block is a hammer for crushing a silicon block so as to carry out shape processing with respect to the silicon block, the hammer including: a handle (10) made of a resin; and a hammer head (20) fixed to the handle (10).

8 Claims, 6 Drawing Sheets

(56) References Cited

U.S. PATENT DOCUMENTS

Figure 1:
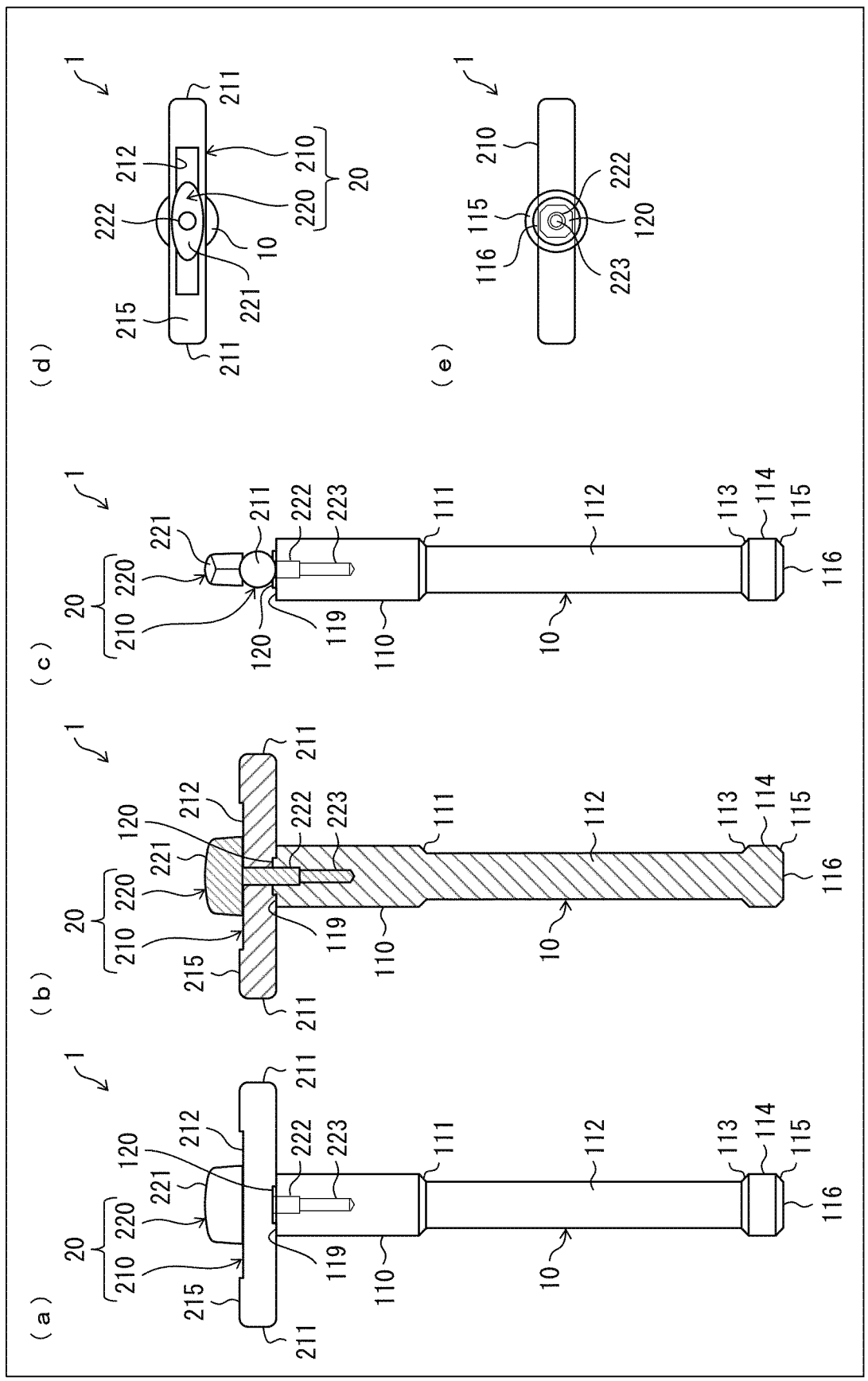

| | | | |
|---|---|---|---|
| 6,311,369 | B1 | 11/2001 | Ryu |
| 6,763,747 | B1 | 7/2004 | Gierer et al. |
| 7,950,308 | B2 | 5/2011 | Atsumi |
| 2009/0056504 | A1 | 3/2009 | Atsumi et al. |
| 2009/0075747 | A1 | 3/2009 | Kou |
| 2010/0025060 | A1 | 2/2010 | Yamane |
| 2018/0264639 | A1* | 9/2018 | Anderson ................ B25G 3/14 |

FOREIGN PATENT DOCUMENTS

| | | |
|---|---|---|
| CN | 1154673 A | 7/1997 |
| CN | 1198978 A | 11/1998 |
| CN | 1450948 A | 10/2003 |
| CN | 101376242 A | 3/2009 |
| CN | 101815599 A | 8/2010 |
| CN | 203171561 U | 9/2013 |
| CN | 104275680 A | 1/2015 |
| CN | 204976544 | 1/2016 |
| EP | 539097 | 4/1993 |
| GB | 1446332 A | 8/1976 |
| JP | 57-023986 | 2/1982 |
| JP | 60-172677 | 11/1985 |
| JP | 4-348883 | 12/1992 |
| JP | 6-218677 | 8/1994 |
| JP | 10-6242 | 1/1998 |
| JP | 2010-030026 | 2/2010 |
| WO | 2008/47850 | 4/2008 |

OTHER PUBLICATIONS

Extended European Search Report for EP Patent Application No. 19760941.5, dated Mar. 31, 2021, 8 pages.
Office Action for TW Application No. 108105790, dated Oct. 18, 2021, 6 pages.
English Translation of International Preliminary Report on Patentability (Chapter II) for PCT/JP2019/006403, dated Aug. 27, 2020, 5 pages.
International Search Report for PCT/JP2019/006403, dated Apr. 9, 2019, 1 page.
Office Action For CN Patent Application No. 201980013935.4, dated Jan. 29, 2021, 13 pages.

\* cited by examiner

HAMMER

TECHNICAL FIELD

The present invention relates to a hammer.

BACKGROUND ART

A hammer for carrying out shape processing with respect to a silicon block is known as a conventional technique. Examples of such a hammer include a less-polluting impact tool disclosed in Patent Literature 1. The less-polluting impact tool includes a core that forms a handle part and a head part. The head part is fixed in contact with a tungsten-carbide alloy hit element. The core is encapsulated in a synthetic resin.

CITATION LIST

Patent Literature

[Patent Literature 1]
Japanese Patent Application Publication Tokukaihei No. 6-218677 (Publication date: Aug. 9, 1994)

SUMMARY OF INVENTION

Technical Problem

However, since the less-polluting impact tool disclosed in Patent Literature 1 has a structure in which a core is coated with a synthetic resin, a fragment of a silicon block may enter a space between the core and the synthetic resin. Thus, entry of the fragment of the silicon block into the space between the core and the synthetic resin causes the core and the synthetic resin to be scraped off. In particular, a silicon block obtained by roughly crushing a polycrystalline silicon rod produced by the Siemens process has a surface having complicated irregularities. Thus, in a case where shape processing is carried out with respect to a silicon block, a fragment having a sharp-pointed protrusion is easily produced. Such a fragment easily (i) enters a space between a core and a synthetic resin and (ii) causes the core and the synthetic resin to be scraped off. Therefore, according to the less-polluting impact tool, impurities produced due to scraping off of a core and a synthetic resin unfortunately may enter a silicon piece to be obtained by carrying out shape processing with respect to a silicon block.

An object of an aspect of the present invention is to, without entry of a fragment of a silicon block into a handle, prevent impurities from entering a silicon piece to be obtained by carrying out shape processing with respect to the silicon block.

Solution to Problem

In order to attain the object, a hammer for use in shape processing of a silicon block in accordance with an aspect of the present invention is a hammer for crushing a silicon block so as to carry out shape processing with respect to the silicon block, the hammer including: a handle made of a resin; and a hammer head fixed to the handle.

Advantageous Effects of Invention

An aspect of the present invention makes it possible to, without entry of a fragment of a silicon block into a handle, prevent impurities from entering a silicon piece to be obtained by carrying out shape processing with respect to the silicon block.

BRIEF DESCRIPTION OF DRAWINGS (a) through (e) of FIG. 1 are views each illustrating a configuration of a hammer in accordance with Embodiment 1 of the present invention.

Figure 2:
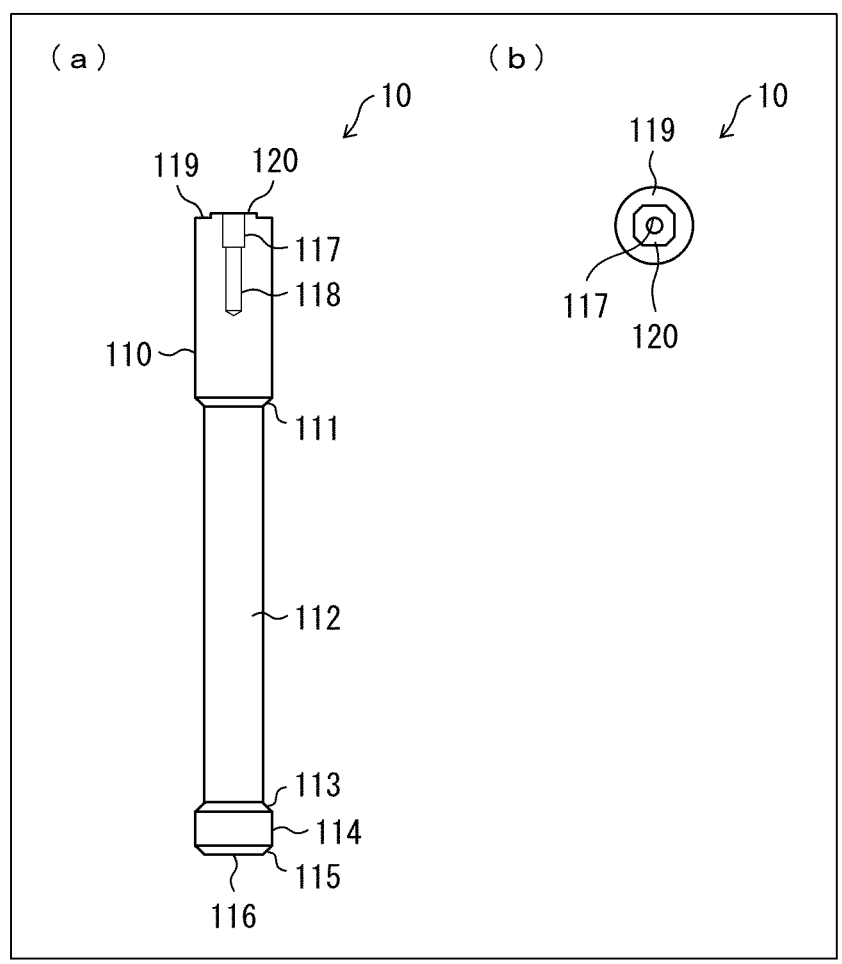

(a) and (b) of FIG. 2 are views each illustrating a configuration of a handle of the hammer in accordance with Embodiment 1 of the present invention.

Figure 3:
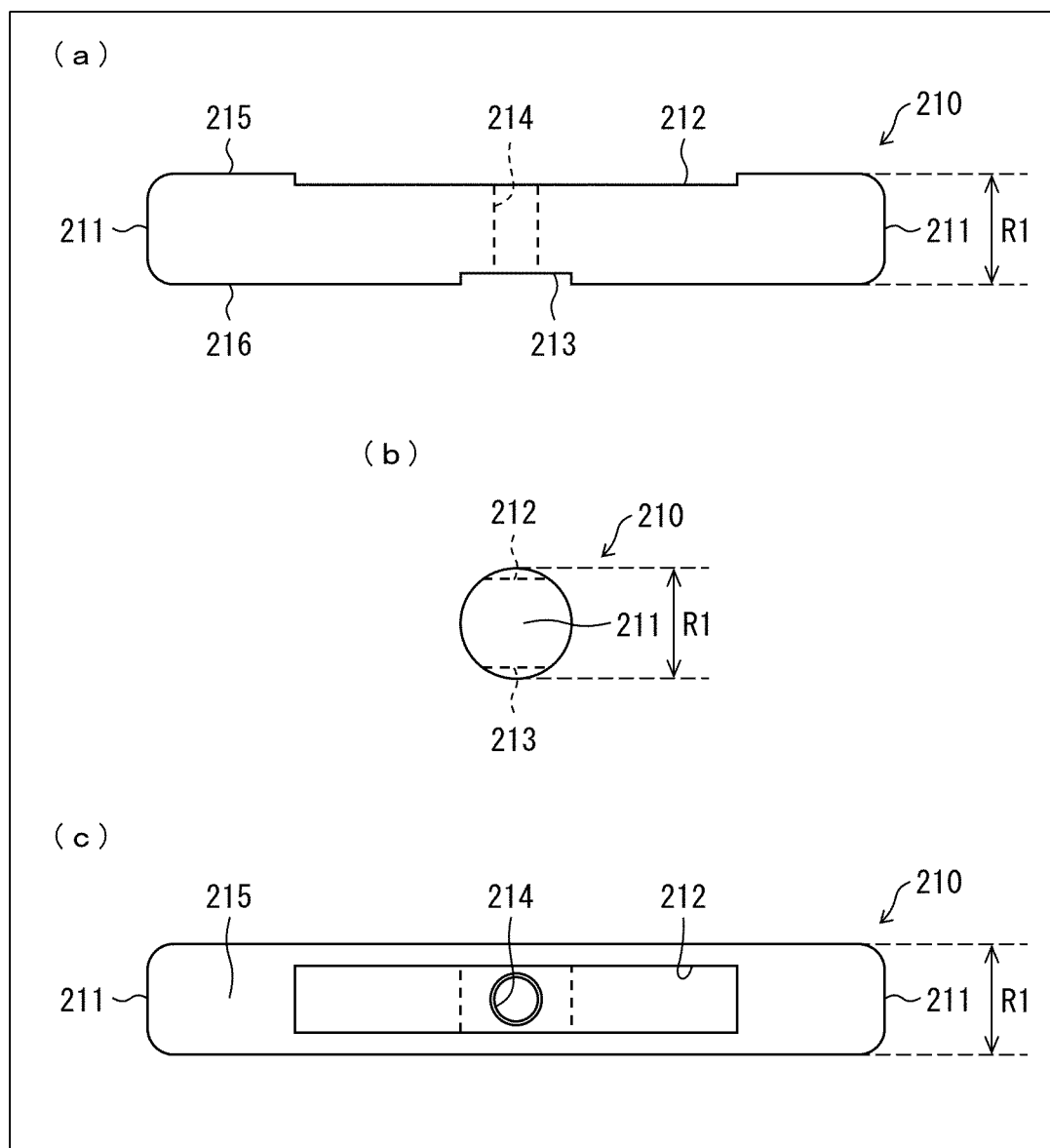

(a) through (c) of FIG. 3 are views each illustrating a configuration of a head part of a hammer head of the hammer in accordance with Embodiment 1 of the present invention.

Figure 4:
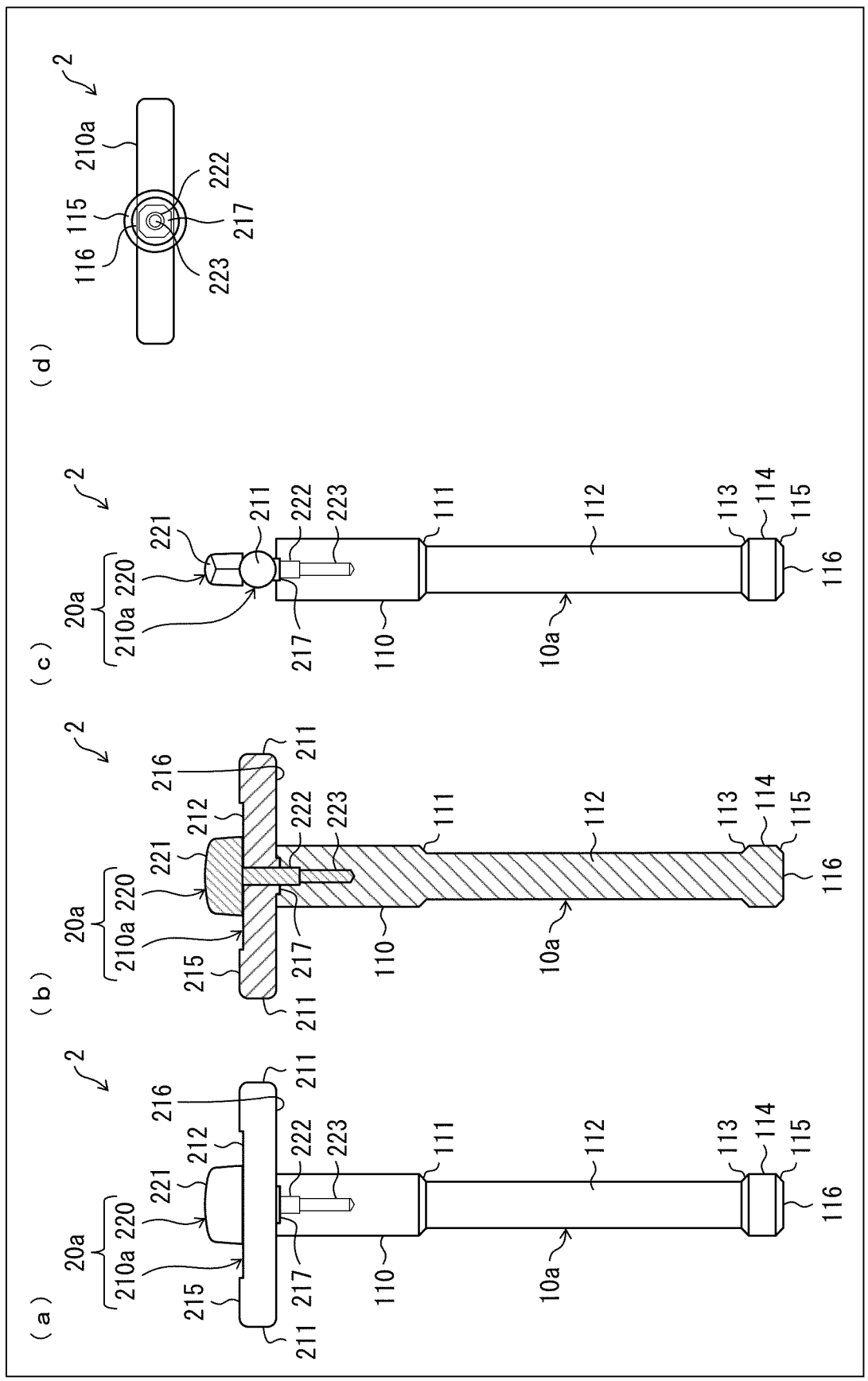

(a) through (d) of FIG. 4 are views each illustrating a configuration of a hammer in accordance with Embodiment 2 of the present invention.

Figure 5:
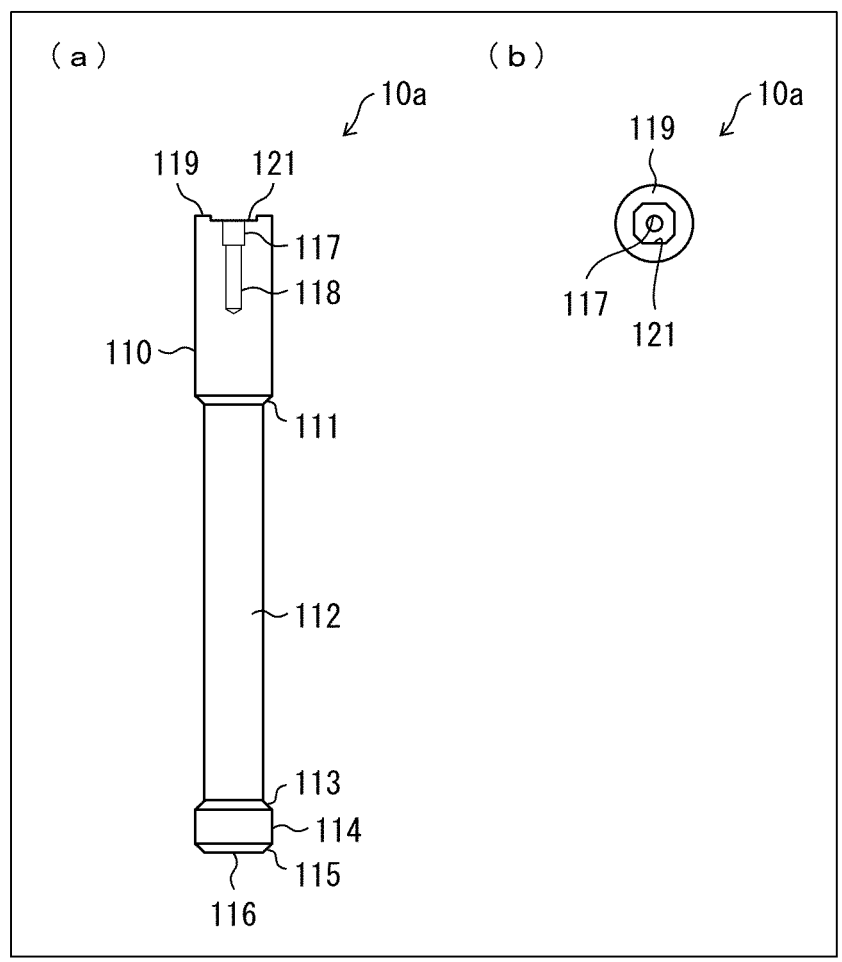

(a) and (b) of FIG. 5 are views each illustrating a configuration of a handle of the hammer in accordance with Embodiment 2 of the present invention.

Figure 6:
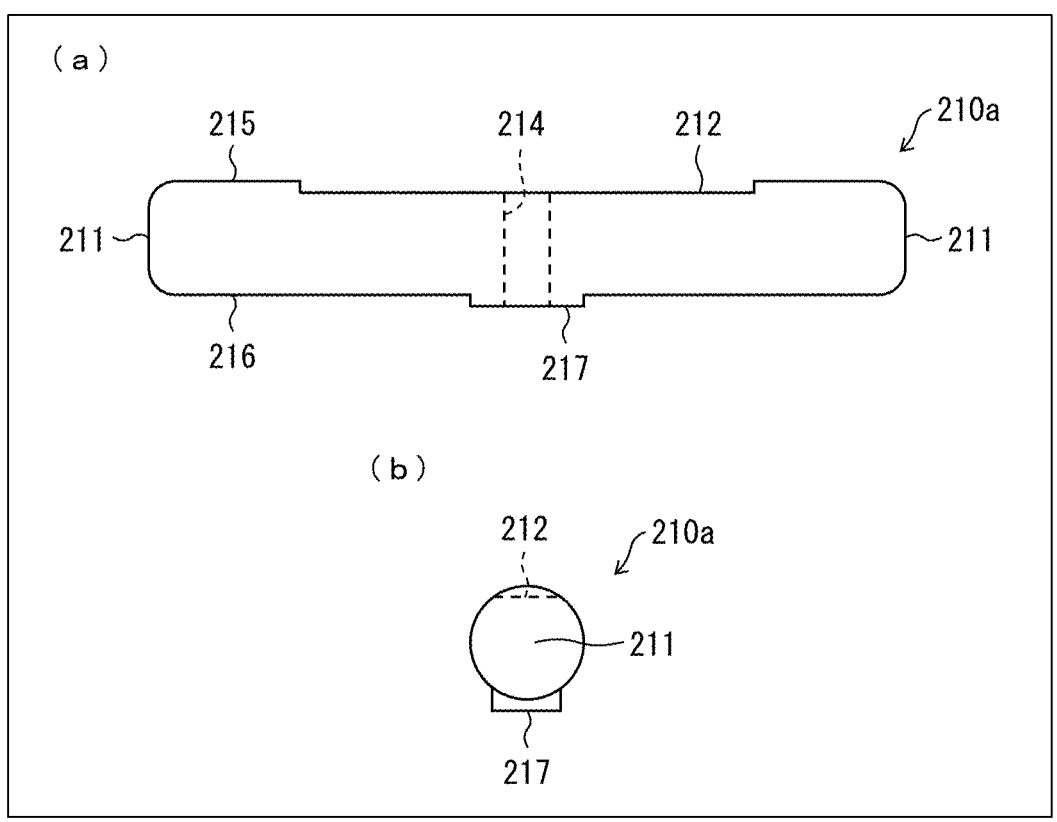

(a) and (b) of FIG. 6 are views each illustrating a configuration of a head part of a hammer head of the hammer in accordance with Embodiment 2 of the present invention.

DESCRIPTION OF EMBODIMENTS

Embodiment 1

(Method for Producing Polycrystalline Silicon)

A hammer in accordance with an aspect of the present invention is used in a method for producing polycrystalline silicon. The method for producing polycrystalline silicon is exemplified by, but not particularly limited to, a production method including a silicon deposition step of depositing polycrystalline silicon by reacting a chlorosilane compound and hydrogen together in a reactor. The Siemens process is known as a method for depositing silicon. According to the Siemens process, trichlorosilane and hydrogen are reacted with each other in a bell-shaped (bell jar-shaped) reactor. Then, polycrystalline silicon is deposited on a surface of a polycrystalline silicon deposition filament that is provided in the reactor so as to stand upright, so that a grown polycrystalline silicon rod is obtained.

The method for producing polycrystalline silicon further includes the step of crushing the polycrystalline silicon rod obtained through the silicon deposition step. In the step of crushing the polycrystalline silicon rod, the silicon rod is roughly crushed with use of a crushing device or a large hammer, and a silicon block obtained by roughly crushing the silicon rod is crushed into pieces with use of a hammer so as to be subjected to shape processing, so that a silicon piece in a form of a nugget or a chip is obtained. The hammer in accordance with an aspect of the present invention is used, during the step of crushing the polycrystalline silicon rod, to (i) crush, into pieces, the silicon block obtained by roughly crushing the silicon rod and (ii) carry out shape processing with respect to the silicon block. The method for producing polycrystalline silicon can further include (i) the step of classifying the polycrystalline silicon crushed and (ii) the step of cleaning the polycrystalline silicon.

(Configuration of Hammer 1)

(a) through (e) of FIG. 1 are views each illustrating a configuration of a hammer 1 in accordance with Embodiment 1 of the present invention. Specifically, (a) of FIG. 1 is a front view of the hammer 1, (b) of FIG. 1 is a cross-sectional view of the hammer 1, and (c) of FIG. 1 is a left side view of the hammer 1. (d) of FIG. 1 is a plan view of the hammer 1, and (e) of FIG. 1 is a bottom view of the hammer 1. A rear view of the hammer 1 is omitted because the rear view of the hammer 1 and the front view of the hammer 1 of (a) of FIG. 1 are identical in appearance. A right side view of the hammer 1 is omitted because the right side view of the hammer 1 and the left side view of the hammer 1 of (c) of FIG. 1 are identical in appearance.

(a) and (b) of FIG. 2 are views each illustrating a configuration of a handle 10 of the hammer 1 in accordance with Embodiment 1 of the present invention. Specifically, (a) of FIG. 2 is a front view of the handle 10, and (b) of FIG. 2 is a plan view of the handle 10. (a) through (c) of FIG. 3 are views each illustrating a configuration of a head part 210 of a hammer head 20 of the hammer 1 in accordance with Embodiment 1 of the present invention. Specifically, (a) of FIG. 3 is a front view of the head part 210, (b) of FIG. 3 is a left side view of the head part 210, and (c) of FIG. 3 is a plan view of the head part 210.

As illustrated in (a) through (e) of FIG. 1, the hammer 1 is a hammer for use in shape processing of a silicon block, the hammer including: the handle 10; and the hammer head 20 fixed to the handle 10. The hammer 1 is used to crush the silicon block so as to carry out shape processing with respect to the silicon block. Specifically, by using the hammer 1, it is possible to adjust a size of the silicon block and shave off the silicon block. The silicon block is exemplified by a polycrystalline silicon (polysilicon) mass, particularly by a silicon block obtained by roughly crushing a polycrystalline silicon rod produced by the Siemens process. Note here that a hammer head 20 side and a handle 10 side of the hammer 1 are referred to as an upper side and a lower side, respectively.

(Configuration of Handle 10)

As illustrated in (a) through (c) of FIG. 1 and (a) of FIG. 2, the handle 10 includes an upper part 110, an inclined part 111, a central part 112, an inclined part 113, a bottom part 114, and an inclined part 115 that are provided in this order from above. The upper part 110, the central part 112, and the bottom part 114 each have a cylindrical shape. The upper part 110 and the bottom part 114 have respective cross sections that are identical in diameter. The central part 112 has a cross section that is smaller in diameter than the cross section of the upper part 110. Note here that a diameter of a cross section refers to a diameter of a cross section that is perpendicular to a longer side direction of the handle 10.

The inclined part 111 that is provided between the upper part 110 and the central part 112 is shaped such that the inclined part 111 has a cross section whose diameter is made larger as the inclined part 111 extends toward the upper part 110. The inclined part 113 that is provided between the central part 112 and the bottom part 114 is shaped such that the inclined part 113 has a cross section whose diameter is made larger as the inclined part 113 extends toward the bottom part 114. The inclined part 115 that is provided on a first side of the bottom part 114 which first side is opposite from a second side of the bottom part 114 on which second side the inclined part 113 is provided is shaped such that the inclined part 115 has a cross section whose diameter is made larger as the inclined part 115 extends toward the bottom part 114.

As illustrated in (a) and (b) of FIG. 2, the handle 10 has an upper surface 119 that is provided with a protrusion 120 that is prismatic. Note here that the protrusion 120 has a shape obtained by cutting off, from a rectangular parallelepiped, corners located on respective lateral sides of the rectangular parallelepiped. The protrusion 120 is provided with a hole 118. The hole 118 is provided with a helicoid insert 117 that (i) is provided with a female screw, (ii) is made of metal, and (iii) is coiled. The hole 118 is provided in the upper part 110.

The handle 10 has a weight of preferably not less than 60 g and not more than 170 g, and more preferably not less than 70 g and not more than 150 g. This makes it possible to (i) allow the hammer 1 to be more handleable and safer and (ii) easily carry out precise shape processing with respect to a silicon block.

The handle 10 is made of a resin. The expression "made of a resin" does not necessarily mean that the handle 10 is made only of a resin, but means that the handle can contain not only a resin but also a component that is supplementarily provided to the resin.

Examples of the component that is supplementarily provided to the resin include (i) a material for curing the resin and (ii) the helicoid insert 117 that is provided to the hole 118 that is provided in the handle 10. That is, the expression "made of a resin" means that the handle 10 is mainly made of a resin. A configuration "made of a resin" does not include, for example, a configuration in which a core made of metal or wood is surrounded with a resin.

The handle 10 preferably has an elastic modulus of not less than 2000 MPa and not more than 5000 MPa. The handle 10 more preferably has an elastic modulus of not less than 2500 MPa and not more than 4500 MPa. Note here that the elastic modulus of the handle 10 is a value measured in conformity with ASTM D790.

The handle 10 that has an elastic modulus of not more than 5000 MPa makes it possible to, while preventing the handle 10 from excessively bending, further improve workability of shape processing of a silicon block due to bending of the handle 10 during a hit of the hammer 1. Furthermore, in a case where the handle 10 has an elastic modulus of not more than 5000 MPa, while a silicon block is being crushed with use of the hammer 1, an impact on the handle 10 can be reduced to a satisfactory degree, so that an impact on a user of the hammer 1 can be reduced. Moreover, the handle 10 that has an elastic modulus of not more than 5000 MPa prevents the handle 10 from being easily broken even in a case where an impact is made on the handle 10 while a silicon block is being crushed with use of the hammer 1.

The handle 10 that has an elastic modulus of not less than 2000 MPa allows the handle 10 to be so strong as to be less easily deformed. Furthermore, even in a case where a part of a hit surface 211 of the hammer head 20 which part is slightly off a center of the hit surface 211 is hit on a protrusion of a surface of a silicon block, a follow-up correction can be carried out by bending of the handle 10, which has an elastic modulus of not less than 2000 MPa and not more than 5000 MPa. The follow-up correction means that the center of the hit surface 211 follows the protrusion of the surface of the silicon block. Thus, it is possible to improve workability of shape processing of a silicon block while preventing a reduction in crushing effect of the hammer 1.

Note that the handle 10 preferably has a Rockwell hardness of not less than R 90 and not more than R 130. The handle 10 more preferably has a Rockwell hardness of not less than R 110 and not more than R 130. The handle 10 still more preferably has a Rockwell hardness of not less than R 115 and not more than R 129. Note here that the Rockwell hardness of the handle 10 is a value measured in conformity with ASTM D785.

The handle 10 that has a Rockwell hardness of not less than R 90, particularly not less than R 110 has a surface having a certain degree of hardness. With the configuration, even in a case where the handle 10 and a sharp-pointed protrusion of a silicon block are brought into contact with each other while the silicon block is being crushed, the surface of the handle 10 is less easily broken and less easily scraped off. The handle 10 that has a Rockwell hardness of not more than R 130 has, for example, impact resistance. With the configuration, even in a case where an impact is made on the handle 10 while a silicon block is being crushed, the handle 10 is less easily cracked, and the handle 10 is less easily broken.

The resin of which the handle 10 is made is preferably an amorphous resin. In a case where the resin of which the handle 10 is made is an amorphous resin, the resin has an elastic modulus having a moderate value. This allows the handle 10 to be moderately rigid, so that workability of shape processing of a silicon block can be further improved due to bending of the handle 10 during a hit of the hammer 1.

Examples of the amorphous resin include polyarylate, polysulfone, polyether sulfone, polyether-imide, and polyamide-imide. Of these amorphous resins, polyether-imide is particularly preferable.

Furthermore, the resin of which the handle 10 is made is more preferably a resin containing no inorganic filler. With the configuration, a silicon piece to be obtained by carrying out shape processing with respect to a silicon block can have a lower metal concentration, as compared with a case where the handle 10 is made of a resin containing an inorganic filler. This is because the handle 10 that is made of a resin containing no inorganic filler prevents a metal derived from an inorganic filler from adhering to a surface of a silicon piece.

Examples of an inorganic compound that is blended, as an inorganic filler, with a resin so that mechanical strength is increased include inorganic compounds (e.g., an inorganic pigment and an inorganic nucleating agent) each of which is blended, as another component blended in a small amount, with a resin. Thus, according to an aspect of the present invention, not only a mode in which a resin contains no inorganic compound that is thus blended as an inorganic filler but also a state in which, in order that an object different from an increase in mechanical strength is attained, an inorganic compound serving as, for example, a component blended in a small amount is blended with a resin is acceptable as a resin "containing no inorganic filler". Specifically, a resin containing an inorganic compound in an amount of not more than 1000 ppm, and more preferably not more than 800 ppm is acceptable as the scope of a resin "containing no inorganic filler".

Examples of a resin containing no inorganic filler include polyarylate, polysulfone, polyether sulfone, polyether-imide, and polyamide-imide. Of these resins, polyether-imide is particularly preferable. According to such a resin, even in a case where no inorganic filler is contained in the resin, it is possible to fully achieve the above Rockwell hardness of the handle 10. Examples of the inorganic filler include a titanium oxide, talc, mica, silica, and a glass filler.

In contrast, according to a hammer that has a handle made of a metal such as SCM440 (chromium molybdenum steel), a silicon piece to be obtained by carrying out shape processing with respect to a silicon block has a high metal concentration. Also in the case of a hammer that has a handle made of a resin such as (i) polypropylene in which a titanium oxide is added as an inorganic filler or (ii) fiber reinforced plastic (FRP) in which glass fiber, carbon fiber, or the like is added as an inorganic filler, a silicon piece to be obtained by carrying out shape processing with respect to a silicon block has a high metal concentration due to adhesion, to a surface of the silicon piece, of a metal derived from the inorganic filler.

(Evaluation of Hammer for Use in Shape Processing of Silicon Block)

Various types of hammers for use in shape processing of a silicon block were evaluated for the following four items: "surface metal contamination", "direction controllability", "impact reducing effect", and "presence of crack". Hammers different from each other in material of which a handle is made were used to crush 13 tons (t) of a silicon block, so that the hammers were evaluated for "surface metal contamination". In 50 ml of a fluonitric acid mixed solution, 90 g of a silicon piece having a size of not less than 5 mm and not more than 60 mm was immersed for 15 minutes so that an oxidized layer of a surface of the silicon piece was removed by being dissolved in the fluonitric acid mixed solution. Thus, an extract was obtained.

In the extract, various metallic elements contained in the surface of the silicon piece serving as a sample were analyzed with use of inductively coupled plasma-mass spectroscopy (ICP-MS). Then, a measured value obtained in the inductively coupled plasma-mass spectroscopy was divided by 90 g so that a silicon content per weight (ppbw) was quantitatively determined. Note that a tiny crack may appear in a handle of a hammer that is being used. Thus, for comparison with each of the hammers to be evaluated for "surface metal contamination", a hammer having, on a surface of a handle thereof, five cracks each reaching a core of the handle and having a length of 10 mm was used to be evaluated for "surface metal contamination".

Table 1 below shows results of quantitative determination of respective amounts of the various metallic elements contained in the surface of the silicon piece. The various metallic elements are iron (Fe), chromium (Cr), nickel (Ni), aluminum (Al), calcium (Ca), titanium (Ti), cobalt (Co), and tungsten (W). Table 1 also shows an elastic modulus and a Rockwell hardness of a handle of a hammer.

TABLE 1

| Material of which handle of hammer is made | Elastic modulus MPa | Rockwell hardness | Fe ppbw | Cr ppbw | Ni ppbw | Al ppbw | Ca ppbw | Ti ppbw | Co ppbw | W ppbw | Total ppbw |
|---|---|---|---|---|---|---|---|---|---|---|---|
| Polyether-imide | 3300 | R 127 | 0.72 | 0.13 | 0.08 | 0.09 | 0.11 | 0.14 | 1.31 | 5.18 | 7.76 |
| Polyamide-imide | 3600 | R 127 | 0.83 | 0.14 | 0.11 | 0.18 | 0.23 | 0.14 | 1.52 | 5.23 | 8.38 |
| Chromium molybdenum steel (SCM440) | 8100 | — | 4.34 | 0.41 | 0.32 | 0.29 | 1.18 | 0.53 | 3.14 | 6.74 | 16.95 |

TABLE 1-continued

| Material of which handle of hammer is made | Elastic modulus MPa | Rockwell hardness | Fe ppbw | Cr ppbw | Ni ppbw | Al ppbw | Ca ppbw | Ti ppbw | Co ppbw | W ppbw | Total ppbw |
|---|---|---|---|---|---|---|---|---|---|---|---|
| Polypropylene | 1500 | R 90 | 2.16 | 0.22 | 0.21 | 0.23 | 0.78 | 1.21 | 2.28 | 5.82 | 12.91 |
| FRP (unsaturated polyester) | 12000 | R 122 | 2.78 | 0.28 | 0.23 | 1.62 | 2.17 | 0.59 | 1.87 | 5.21 | 14.75 |
| Stainless steel coated with polyurethane | — | — | 1.58 | 0.38 | 0.22 | 1.23 | 1.87 | 2.54 | 1.61 | 5.11 | 14.54 |
| Stainless steel coated with polyurethane (cracked product) | — | — | 3.12 | 1.02 | 0.66 | 1.78 | 2.02 | 3.31 | 1.49 | 5.01 | 18.41 |

In Table 1, a handle of a hammer which handle is made of a polypropylene resin contains a titanium oxide. FRP (unsaturated polyester), in which glass fiber is used, contains Al and Ca (impurity metallic elements contained in a small amount in the glass fiber). Note that Table 1 does not show a Rockwell hardness obtained in a case where a handle of a hammer is made of a metal. This is because of the following reason. Specifically, a hardness of a resin is commonly susceptible to a temperature and a humidity unlike a hardness of a metal, and a resin has a viscoelastic property and a creep characteristic each indicating a recovery from, for example, a strain. It is therefore difficult to compare a hardness of a resin and a hardness of a metal.

As shown in Table 1, in a case where a handle of a hammer is made of polyether-imide, the various metallic elements are contained in an amount of 7.76 (ppbw) in total. In a case where a handle of a hammer is made of polyamide-imide, the various metallic elements are contained in an amount of 8.38 (ppbw) in total.

In a case where a handle of a hammer is made of chromium molybdenum steel (SCM440), the various metallic elements are contained in an amount of 16.95 (ppbw) in total. In a case where a handle of a hammer is made of polypropylene, the various metallic elements are contained in an amount of 12.91 (ppbw) in total. In a case where a handle of a hammer is made of FRP, the various metallic elements are contained in an amount of 14.75 (ppbw) in total.

In a case where a handle of a hammer is made of stainless steel coated with polyurethane, the various metallic elements are contained in an amount of 14.54 (ppbw) in total. In a case where a handle of a hammer is made of stainless steel coated with polyurethane (a cracked product), the various metallic elements are contained in an amount of 18.41 (ppbw) in total.

As described above, the various metallic elements are contained in a much smaller amount in a case where the handle of the hammer is made of polyether-imide or polyamide-imide than in a case where the handle of the hammer is made of another material that is different from each of polyether-imide and polyamide-imide. Thus, in a case where the hammer 1 in accordance with an aspect of the present invention is used, the hammer 1 including the handle 10 that is made of a resin containing no inorganic filler, such as polyether-imide or polyamide-imide, a silicon piece to be obtained by carrying out shape processing with respect to a silicon block can have a lower metal concentration.

Furthermore, the handle of the hammer which handle is made of polyether-imide has a Rockwell hardness of R 127. The handle of the hammer which handle is made of polyamide-imide has a Rockwell hardness of R 127. The handle of the hammer which handle is made of polypropylene has a Rockwell hardness of R 90. The handle of the hammer which handle is made of FRP has a Rockwell hardness of R 122. Thus, in a case where the handle 10 is made of a resin that is polyether-imide, polyamide-imide, polypropylene, or FRP, it is possible to fully achieve the above Rockwell hardness of the handle 10.

Hammers different from each other in weight ratio of a handle to a hammer head were used to hit, 10 times, an ultra-hard metallic plate (5 cm×5 cm×1 cm) one side of which was provided with pressure-sensitive paper, so that the hammers were evaluated for "direction controllability". Specifically, the ultra-hard metallic plate that was placed on a hand was hit 10 times by lowering a hammer, while aiming at a center of the pressure-sensitive paper, from a place 20 cm distant from the pressure-sensitive paper. The pressure-sensitive paper was peeled off from the ultra-hard metallic plate so that a position of a hit point at which position the pressure-sensitive paper had colored was analyzed. Distances between the position of the hit point and the center of the pressure-sensitive paper were calculated, and total sums of the distances obtained by hitting the ultra-hard metallic plate 10 times with the hammers were compared. Table 2 below shows a result obtained by hitting the ultra-hard metallic plate.

TABLE 2

| Weight ratio of handle to hammer head | 0.4 | 0.1 | 1.2 |
|---|---|---|---|
| Distance between position of hit point and center of pressure-sensitive paper (mm) | 21 | 51 | 60 |

As shown in Table 2, in a case where a weight ratio of a handle to a hammer head is 0.4, a distance between the position of the hit point and the center of the pressure-sensitive paper is 21 mm. In a case where a weight ratio of a handle to a hammer head is 0.1, a distance between the position of the hit point and the center of the pressure-sensitive paper is 51 mm. In a case where a weight ratio of a handle to a hammer head is 1.2, a distance between the position of the hit point and the center of the pressure-sensitive paper is 60 mm.

As described above, a distance between the position of the hit point and the center of the pressure-sensitive paper can be made shorter in a case where a weight ratio of the handle to the hammer head is 0.4 than in a case where a weight ratio of the handle to the hammer head is 0.1 or 1.2. Thus, in order to achieve a more handleable and safer hammer, a weight ratio of the handle 10 to the hammer head 20 is preferably not less than 0.15 and not more than 1.00, and more preferably not less than 0.2 and not more than 0.7, as described later.

Hammers different from each other in material of which a handle is made were used to crush 13 t of a silicon block, so that the hammers were evaluated for "impact reducing effect". Specifically, a questionnaire survey was carried out with respect to 10 users of a hammer. The users of the hammer were each caused to carry out scoring between 1 point to 5 points in accordance with a magnitude of an impact made during use of the hammer.

In this case, the users of the hammer were each caused to carry out scoring so as to give a greater point to a smaller impact made during use of the hammer. A score of 5 points and a score of 1 point were assumed to be "an impact is small" and "an impact is great", respectively. Averages of results of the scoring carried out by workers (the users of the hammer) who had an experience in working with use of the hammer for not less than 3 months were compared for each of the hammers.

Table 3 shows (i) an elastic modulus of a handle of a hammer, (ii) an average of the results of the scoring carried out by the users of the hammer, and (iii) appearance of the handle of the hammer. The appearance of the handle of the hammer shows, in a case where the appearance of the handle of the hammer that has not been used and the appearance of the handle of the hammer that has been used are compared, the appearance of the handle of the hammer that has been used.

TABLE 3

| | Material of which handle of hammer is made | | | |
|---|---|---|---|---|
| | Polyether-imide | Polypropylene | Chromium molybdenum steel (SCM440) | Polybenzimidazole |
| Elastic modulus of handle (MPa) | 3300 | 1500 | 8100 | 6500 |
| Average of results of scoring | 4.2 | 4.8 | 1.8 | 3.0 |
| Appearance of handle | with no change | with slight bend | with no change | with crack |

As shown in Table 3, in a case where the handle of the hammer is made of polyether-imide, the handle of the hammer has an elastic modulus of 3300 MPa, an average of the results of the scoring carried out by the users of the hammer is 4.2 points, and the appearance of the handle of the hammer is "with no change". In a case where the handle of the hammer is made of polypropylene, the handle of the hammer has an elastic modulus of 1500 MPa, an average of the results of the scoring carried out by the users of the hammer is 4.8 points, and the appearance of the handle of the hammer is "with slight bend".

In a case where the handle of the hammer is made of chromium molybdenum steel, the handle of the hammer has an elastic modulus of 8100 MPa, an average of the results of the scoring carried out by the users of the hammer is 1.8 points, and the appearance of the handle of the hammer is "with no change". In a case where the handle of the hammer is made of polybenzimidazole, the handle of the hammer has an elastic modulus of 6500 MPa, an average of the results of the scoring carried out by the users of the hammer is 3.0 points, and the appearance of the handle of the hammer is "with crack".

As described above, in a case where the handle of the hammer is made of polyether-imide or polypropylene, an average of the results of the scoring carried out by the users of the hammer is higher, and the appearance of the handle of the hammer is better, as compared with a case where the handle of the hammer is made of a material that is different from each of polyether-imide and polypropylene. Thus, in a case where the hammer 1 in accordance with an aspect of the present invention is used, the hammer 1 including the handle 10 that is made of a resin such as polyether-imide or polypropylene, a smaller impact can be made on a user of the hammer 1. Furthermore, in a case where the hammer 1 thus configured is used, it is possible to keep the appearance of the handle 10 good even in a case where an impact is made on the handle 10 while a silicon block is being crushed with use of the hammer 1. Moreover, a resin such as polyether-imide or polypropylene makes it possible to fully achieve the above elastic modulus of the handle 10.

Hammers different from each other in curvature radius of a corner of a hit surface of a hammer head were used to crush 13 t of a silicon block, so that the hammers were evaluated for "presence of crack". The hammers were compared in terms of (i) presence of a crack in the hammer head and (ii) an amount of fine powder produced in the hammer head. Furthermore, the hammers were each inspected for a crack in the hammer head by fixing a diameter of the hit surface of the hammer head to 15 mm and changing the curvature radius of the corner of the hit surface. Table 4 shows a result of the inspection for a crack in the hammer head.

TABLE 4

| Curvature radius | 1 mm | None | 6 mm |
|---|---|---|---|
| Presence of crack | No crack is present | Crack is present in edge part | No crack is present |
| Amount of production of fine powder of less than 2 mm (wt %) | 1 | 1 | 5 |

As shown in Table 4, in a case where the corner of the hit surface of the hammer head has a curvature radius of 1 mm, "no crack is present" in the hammer head, and fine powder having a size of less than 2 mm is produced in an amount of 1 wt %. In a case where the corner of the hit surface of the hammer head has no curvature radius, i.e., the corner of the hit surface of the hammer head is not rounded, "a crack is present in an edge part" of the hammer head, and fine powder having a size of less than 2 mm is produced in an amount of 1 wt %. In a case where the corner of the hit surface of the hammer head has a curvature radius of 6 mm, "no crack is present" in the hammer head, and fine powder having a size of less than 2 mm is produced in an amount of 5 wt %.

As described above, in a case where the corner of the hit surface of the hammer head has a curvature radius of 1 mm, "no crack is present" in the hammer head, and fine powder having a size of less than 2 mm can be produced in a smaller amount, as compared with a case where the corner of the hit surface of the hammer head has no curvature radius or a curvature radius of 6 mm. In order to (i) prevent a crack from being made in the hammer head and (ii) reduce production of fine powder, the hit surface 211 of the hammer head 20 preferably has a corner having a curvature radius of not less than 1 mm and not more than 5 mm, as described later.

Note that the handle 10 can be made only of a resin. The expression "made only of a resin" means containing no component that is supplementarily provided to the resin. In this case, a screw made of a metal and the handle 10 made of a resin are ordinarily brought into direct contact with each other at a connection between the handle 10 and the hammer head 20. A strong impact is made on the connection while the hammer is being used. Thus, in a case where the handle 10 is configured to be made only of a resin, a screw groove of the resin may be broken. Therefore, an aspect in which the handle 10 is provided with the helicoid insert 117 is more preferable.

The handle 10 is made up of a single resin layer. That is, for example, the handle 10 has neither a two-layer structure including a core made of metal or wood and a resin layer nor a two-layer structure including two resin layers different from or identical to each other, but is made up of a single resin layer.

In a case where a handle of a hammer includes a plurality of resin layers, impurities are produced due to rubbing between the resin layers during a crush of a silicon block with use of the hammer, so that impurities are produced due to, for example, scraping off of the resin layers due to entry of a fragment of the silicon block into a space between the resin layers. This causes a fear that such impurities may enter a silicon piece to be obtained by carrying out shape processing with respect to the silicon block.

In contrast, in a case where the handle is made up of a single resin layer as in the handle 10, no such impurities are produced. This makes it possible to prevent impurities from entering a silicon piece to be obtained by carrying out shape processing with respect to a silicon block.

(Configuration of Hammer Head 20)

As illustrated in (a) through (d) of FIG. 1, the hammer head 20 includes the head part 210 and a pressing screw 220. As illustrated in (a) through (c) of FIG. 3, the head part 210 has a cylindrical shape and has an upper surface 215 and a lower surface 216 that are provided with a recess 212 and a recess 213, respectively. A hole 214 is provided so as to extend from a center of the recess 212 to a center of the recess 213. The head part 210 has hit surfaces 211 on respective both right and left ends thereof. Note that the head part 210 is preferably made of, for example, an ultra-hard alloy.

As illustrated in (b) of FIG. 3, each of the hit surfaces 211 has a circular shape and preferably has a diameter R1 of not less than 1 cm and not more than 3 cm. This allows the hammer 1 that is small and suitable for crushing a silicon block into pieces and carrying out shape processing with respect to the silicon block to remarkably exhibit an effect of being more handleable.

As illustrated in (a) and (c) of FIG. 3, a hit surface 211 preferably has a corner that is rounded. With the configuration, it is possible to prevent the corner of the hit surface 211 of the hammer head 20 from being cracked due to an impact made during a hit of the hammer 1. This makes it possible to prevent a fragment of the corner of the hit surface 211 from entering a silicon piece to be obtained by carrying out shape processing with respect to a silicon block.

Note that the corner of the hit surface 211 preferably has a curvature radius of not less than 1 mm and not more than 5 mm. With the configuration, it is possible to prevent, at a high level, the corner of the hit surface 211 of the hammer head 20 from being cracked.

As illustrated in (a) through (d) of FIG. 1, the pressing screw 220 includes an abutting part 221, a screw part 222, and a protruding part 223. The pressing screw 220 passes through the head part 210 so as to be fixed to the handle 10.

The screw part 222 is fixed to the abutting part 221, and the protruding part 223 is integrated with the screw part 222. The screw part 222 (i) passes through the hole 214 that is provided in the head part 210 and (ii) is screwed in the helicoid insert 117 that is provided to the hole 118 that is provided in the handle 10. The protruding part 223 is fitted in the hole 118 that is provided in the handle 10. With the configuration, the abutting part 221 abuts on a bottom surface of the recess 212 that is provided in the head part 210. This causes the pressing screw 220 to press the head part 210 toward the handle 10. The hammer head 20 is thus fixed to the handle 10. Note that the bottom surface of the recess 212 is a flat surface.

Since the recess 212 is provided in the head part 210, the abutting part 221 abuts on the bottom surface of the recess 212. This allows the hammer head 20 to be firmly fixed to the handle 10. Note that the abutting part 221 is preferably made of, for example, polyamide. The screw part 222 and the protruding part 223 are each preferably made of, for example, steel use stainless (SUS).

As illustrated in (a) through (c) of FIG. 1, the handle 10 is fixed to the hammer head 20 due to a fit between (i) the recess 213 that is provided in the hammer head 20 and (ii) the protrusion 120 that is provided in the handle 10 and is prismatic. Since the protrusion 120 of the handle 10 which protrusion 120 is fitted to the recess 213 of the hammer head 20 is prismatic, the hammer head 20 can be prevented from rotating with respect to the handle 10. This allows the hammer 1 to be more handleable and safer.

The hammer head 20 has a weight of preferably not less than 170 g and not more than 400 g, and more preferably not less than 215 g and not more than 340 g. This makes it possible to (i) allow the hammer 1 to be more handleable and safer and (ii) easily carry out precise shape processing with respect to a silicon block. A weight ratio of the handle 10 to the hammer head 20 is preferably not less than 0.15 and not more than 1.00, and more preferably not less than 0.2 and not more than 0.7. This allows the hammer 1 to be more handleable and safer. A weight of the hammer head 20 refers to a sum of a weight of the head part 210 and a weight of the pressing screw 220.

Since the handle 10 is semitransparent, the screw part 222 and the protruding part 223 of the pressing screw 220 that are inside the handle 10 can be viewed from outside as illustrated in (a) and (c) of FIG. 1. Furthermore, as illustrated in (a) of FIG. 2, the hole 118 that is provided in the handle 10 and the helicoid insert 117 that is provided to the hole 118 can be viewed from outside in a case where the handle 10 is viewed from the front. Moreover, as illustrated in (e) of FIG. 1 the protrusion 120, the screw part 222, and the protruding part 223 can be viewed from a bottom surface 116 of the handle 10 in a case where the hammer 1 is viewed from below.

Further, as illustrated in (a) through (e) of FIG. 1, the handle 10 is preferably fixed to a center of the hammer head 20. Since the handle 10 is fixed to the center of the hammer head 20, the handle 10 is located along an axis that passes through the center of gravity of the hammer head 20 and extends in a longer side direction of the hammer 1. This makes it easy to move the hammer head 20 in various directions. This allows a fine operation to be carried out with use of the hammer 1 and consequently makes it easy to carry out shape processing with respect to a silicon block from various directions.

In a case where (i) a handle of a hammer has a structure in which a core of the handle is coated with a resin and (ii) an entire surface of the core is coated with the resin, a surface of the core is not externally exposed. However, in a case where a surface of the resin is broken by using the hammer for a long period, the surface of the core may be exposed. In this case, exposure of the surface of the core may cause impurities derived from the core to enter a silicon piece to be obtained by carrying out shape processing with respect to a silicon block.

Furthermore, impurities are produced due to rubbing between the core and the resin during a crush of a silicon block with use of the hammer, so that impurities are produced due to, for example, scraping off of the core and the resin due to entry of a fragment of the silicon block into a space between the core and the resin. This causes a fear that such impurities may enter a silicon piece to be obtained by carrying out shape processing with respect to the silicon block.

In contrast, in a case where the handle 10 is made of a resin as in the hammer 1 of an aspect of the present invention, no core is present inside the handle 10. Thus, no such impurities are produced. This makes it possible to prevent impurities from entering a silicon piece to be obtained by carrying out shape processing with respect to a silicon block.

A silicon block obtained by roughly crushing a silicon rod has a surface having complicated irregularities. The handle 10 that is made of a resin allows the hammer 1 to have a light weight and consequently allows the hammer 1 to be more handleable. Thus, in crushing a silicon block into pieces and carrying out shape processing with respect to the silicon block, it is possible to easily fit the hit surface 211 of the hammer head 20 to a surface of the silicon block and consequently to smoothly process the silicon block.

Embodiment 2

The following description will discuss another embodiment of the present invention with reference to FIGS. 4 through 6. Note that, for convenience, members having functions identical to those of the respective members described in Embodiment 1 are given respective identical reference signs, and a description of those members is omitted here.

(a) through (d) of FIG. 4 are views each illustrating a configuration of a hammer 2 in accordance with Embodiment 2 of the present invention. Specifically, (a) of FIG. 4 is a front view of the hammer 2, (b) of FIG. 4 is a cross-sectional view of the hammer 2, and (c) of FIG. 4 is a left side view of the hammer 2. (d) of FIG. 4 is a plan view of the hammer 2, and (e) of FIG. 4 is a bottom view of the hammer 2. A rear view of the hammer 2 is omitted because the rear view of the hammer 2 and the front view of the hammer 2 of (a) of FIG. 4 are identical in appearance. A right side view of the hammer 2 is omitted because the right side view of the hammer 2 and the left side view of the hammer 2 of (c) of FIG. 4 are identical in appearance. A plan view of the hammer 2 is omitted because the plan view of the hammer 2 and the plan view of the hammer 1 of (d) of FIG. 1 are identical in appearance.

(a) and (b) of FIG. 5 are views each illustrating a configuration of a handle 10a of the hammer 2 in accordance with Embodiment 2 of the present invention. Specifically, (a) of FIG. 5 is a front view of the handle 10a, and (b) of FIG. 5 is a plan view of the handle 10a. (a) and (b) of FIG. 6 are views each illustrating a configuration of a head part 210a of a hammer head 20a of the hammer 2 in accordance with Embodiment 2 of the present invention. Specifically, (a) of FIG. 6 is a front view of the head part 210a, and (b) of FIG. 6 is a left side view of the head part 210a.

As illustrated in (a) through (d) of FIG. 4, the hammer 2 differs from the hammer 1 in that the hammer 2 includes the handle 10a instead of the handle 10 and includes the hammer head 20a instead of the hammer head 20. As illustrated in (a) and (b) of FIG. 5, the handle 10a has an upper surface 119 that is provided with a recess 121. The recess 121 is provided with a hole 118.

As illustrated in (a) and (b) of FIG. 6, the hammer head 20a has a lower surface 216 that is provided with a protrusion 217 that is prismatic. Note here that the protrusion 217 has a shape obtained by cutting off, from a rectangular parallelepiped, corners located on respective lateral sides of the rectangular parallelepiped. A hole 214 is provided so as to extend from a center of a recess 212 to a center of the protrusion 217.

As illustrated in (a) through (c) of FIG. 4, the handle 10a is fixed to the hammer head 20a due to a fit between the protrusion 217 that is provided in the hammer head 20a and (ii) the recess 121 that is provided in the handle 10a. With the configuration, since the protrusion 217 of the hammer head 20a which protrusion 217 is fitted to the recess 121 of the handle 10a is prismatic, the hammer head 20a can be prevented from rotating with respect to the handle 10a. This allows the hammer 2 to be more handleable and safer.

Furthermore, since the handle 10a is semitransparent, as illustrated in (d) of FIG. 4, the protrusion 217, a screw part 222, and a protruding part 223 can be viewed from a bottom surface 116 of the handle 10a in a case where the hammer 2 is viewed from below.

The present invention is not limited to the embodiments, but can be altered by a skilled person in the art within the scope of the claims. The present invention also encompasses, in its technical scope, any embodiment derived by combining technical means disclosed in differing embodiments.

Aspects of the present invention can also be expressed as follows:

A hammer for use in shape processing of a silicon block in accordance with an aspect of the present invention is a hammer for crushing a silicon block so as to carry out shape processing with respect to the silicon block, the hammer including: a handle made of a resin; and a hammer head fixed to the handle.

In a case where (i) the handle has a structure in which a core of the handle is coated with a resin and (ii) an entire surface of the core is coated with the resin, a surface of the core is not externally exposed. However, in a case where a surface of the resin is broken by using the hammer for a long period, the surface of the core may be exposed. In this case, exposure of the surface of the core may cause impurities derived from the core to enter a silicon piece to be obtained by carrying out shape processing with respect to a silicon block.

Furthermore, impurities are produced due to rubbing between the core and the resin during a crush of a silicon block with use of the hammer, so that impurities are produced due to, for example, scraping off of the core and the resin due to entry of a fragment of the silicon block into a space between the core and the resin. This causes a fear that such impurities may enter a silicon piece to be obtained by carrying out shape processing with respect to the silicon block.

In contrast, in a case where the handle is made only of a resin as in the above configuration of an aspect of the present invention, no core is present inside the handle. Thus, no such impurities are produced. This makes it possible to prevent impurities from entering a silicon piece to be obtained by carrying out shape processing with respect to a silicon block.

A silicon block obtained by roughly crushing a silicon rod has a surface having complicated irregularities. The handle that is made of a resin allows the hammer to have a light weight and consequently allows the hammer to be more handleable. Thus, in crushing a silicon block into pieces and carrying out shape processing with respect to the silicon block, it is possible to easily fit a hit surface of the hammer head to a surface of the silicon block and consequently to smoothly process the silicon block.

The hammer in accordance with a further aspect of the present invention is preferably configured such that the handle has a Rockwell hardness of not less than R 110 and not more than R 130.

With the configuration, the handle that has a Rockwell hardness of not less than R 110 has a surface having a certain degree of hardness. With the configuration, even in a case where the handle and a sharp-pointed protrusion of a silicon block are brought into contact with each other while the silicon block is being crushed, the surface of the handle is less easily broken and less easily scraped off. The handle that has a Rockwell hardness of not more than R 130 has, for example, impact resistance. With the configuration, even in a case where an impact is made on the handle while a silicon block is being crushed, the handle is less easily cracked, and the handle is less easily broken.

The hammer in accordance with a further aspect of the present invention is preferably configured such that the handle has a Rockwell hardness of not less than R 115 and not more than R 129.

As compared with a case where the handle has a Rockwell hardness of not less than R 110 and not more than R 130, the configuration makes it possible to further improve an effect such that (i) the surface of the handle is less easily scraped off, (ii) the handle has, for example, impact resistance, (iii) the handle is less easily cracked, and (iv) the handle is less easily broken.

The hammer in accordance with a further aspect of the present invention is preferably configured such that the resin is a resin containing no inorganic filler.

With the configuration, a silicon piece to be obtained by carrying out shape processing with respect to a silicon block can have a lower metal concentration, as compared with a case where the handle is made of a resin containing an inorganic filler. This is because the handle that is made of a resin containing no inorganic filler prevents a metal derived from an inorganic filler from adhering to a surface of a silicon piece.

The hammer in accordance with a further aspect of the present invention is preferably configured such that the handle is made up of a single resin layer.

In a case where the handle includes a plurality of resin layers, impurities are produced due to rubbing between the resin layers during a crush of a silicon block with use of the hammer, so that impurities are produced due to, for example, scraping off of the resin layers due to entry of a fragment of the silicon block into a space between the resin layers. This causes a fear that such impurities may enter a silicon piece to be obtained by carrying out shape processing with respect to the silicon block.

In contrast, in a case where the handle is made up of a single resin layer as in the configuration, no such impurities are produced. This makes it possible to prevent impurities from entering a silicon piece to be obtained by carrying out shape processing with respect to a silicon block.

The hammer in accordance with a further aspect of the present invention is preferably configured such that the handle is fixed to a center of the hammer head.

With the configuration, since the handle is fixed to the center of the hammer head, the handle is located along an axis that passes through the center of gravity of the hammer head and extends in a longer side direction of the hammer. This makes it easy to move the hammer head in various directions. This allows a fine operation to be carried out with use of the hammer and consequently makes it easy to carry out shape processing with respect to a silicon block from various directions.

The hammer in accordance with a further aspect of the present invention is preferably configured such that the hammer head has a hit surface having a rounded corner.

With the configuration, it is possible to prevent the corner of the hit surface of the hammer head from being cracked due to an impact made during a hit of the hammer. This makes it possible to prevent a fragment of the corner of the hit surface from entering a silicon piece to be obtained by carrying out shape processing with respect to a silicon block.

The hammer in accordance with a further aspect of the present invention is preferably configured such that: the handle is provided with one of (i) a protrusion that is prismatic and (ii) a recess; the hammer head is provided with the other one of the protrusion and the recess, the other one being different from the one with which the handle is provided; and the handle is fixed to the hammer head due to a fit between the protrusion and the recess.

With the configuration, since the protrusion of the handle which protrusion is fitted to the recess of the hammer head is prismatic or the protrusion of the hammer head which protrusion is fitted to the recess of the handle is prismatic, the hammer head can be prevented from rotating with respect to the handle. This allows the hammer to be more handleable and safer.

The hammer in accordance with a further aspect of the present invention is preferably configured such that a weight ratio of the handle to the hammer head is not less than 0.15 and not more than 1.00.

The configuration allows the hammer to be more handleable and safer.

The hammer in accordance with a further aspect of the present invention is preferably configured such that the hammer head has a hit surface having a diameter of not less than 1 cm and not more than 3 cm.

The configuration allows the hammer that is small and suitable for crushing a silicon block into pieces and carrying out shape processing with respect to the silicon block to remarkably exhibit an effect of being more handleable.

The hammer in accordance with a further aspect of the present invention is preferably configured such that the handle has an elastic modulus of not less than 2000 MPa and not more than 5000 MPa.

With the configuration, the handle that has an elastic modulus of not more than 5000 MPa makes it possible to, while preventing the handle from excessively bending, further improve workability of shape processing of a silicon block due to bending of the handle during a hit of the hammer. Furthermore, in a case where the handle has an elastic modulus of not more than 5000 MPa, while a silicon block is being crushed with use of the hammer, an impact on the handle can be reduced to a satisfactory degree, so that an impact on a user of the hammer can be reduced. Moreover, the handle that has an elastic modulus of not more than 5000 MPa prevents the handle from being easily broken even in a case where an impact is made on the handle while a silicon block is being crushed with use of the hammer.

The handle that has an elastic modulus of not less than 2000 MPa allows the handle to be so strong as to be less easily deformed. Furthermore, even in a case where a part of a hit surface of the hammer head which part is slightly off a center of the hit surface is hit on a protrusion of a surface of a silicon block, a follow-up correction can be carried out by bending of the handle, which has an elastic modulus of not less than 2000 MPa and not more than 5000 MPa. Thus, it is possible to improve workability of shape processing of a silicon block while preventing a reduction in crushing effect of the hammer.

REFERENCE SIGNS LIST 1, 2 Hammer
10, 10a Handle
20, 20a Hammer head
110 Upper part
111, 113, 115 Inclined part
112 Central part
114 Bottom part
116 Bottom surface
117 Helicoid insert
118, 214 Hole
119, 215 Upper surface
120, 217 Protrusion
121, 212, 213 Recess
210, 210a Head part
211 Hit surface
216 Lower surface
220 Pressing screw
221 Abutting part
222 Screw part
223 Protruding part

The invention claimed is:

1. A hammer for crushing a silicon block so as to carry out shape processing with respect to the silicon block,
said hammer comprising:
a handle made up of a single resin layer; and
a hammer head fixed to the handle,
a resin of the resin layer containing no inorganic filler, and
the handle having a Rockwell hardness of not less than R 110 and not more than R 130.

2. The hammer as set forth in claim 1, wherein the handle has a Rockwell hardness of not less than R 115 and not more than R 129.

3. The hammer as set forth in claim 1, wherein the handle is fixed to a center of the hammer head.

4. The hammer as set forth in claim 1, wherein the hammer head has a hit surface having a rounded corner.

5. The hammer as set forth in claim 1, wherein:
the handle is provided with one of (i) a protrusion that is prismatic and (ii) a recess;
the hammer head is provided with the other one of the protrusion and the recess, the other one being different from the one with which the handle is provided; and
the handle is fixed to the hammer head due to a fit between the protrusion and the recess.

6. The hammer as set forth in claim 1, wherein a weight ratio of the handle to the hammer head is not less than 0.15 and not more than 1.00.

7. The hammer as set forth in claim 1, wherein the hammer head has a hit surface having a diameter of not less than 1 cm and not more than 3 cm.

8. The hammer as set forth in claim 1, wherein the handle has an elastic modulus of not less than 2000 MPa and not more than 5000 MPa.

* * * * *

UNITED STATES PATENT AND TRADEMARK OFFICE
CERTIFICATE OF CORRECTION

| | |
|---|---|
| PATENT NO. | : 11,794,330 B2 |
| APPLICATION NO. | : 16/970289 |
| DATED | : October 24, 2023 |
| INVENTOR(S) | : Kazuhiro Kawaguchi |

It is certified that error appears in the above-identified patent and that said Letters Patent is hereby corrected as shown below:

On the Title Page

Item (73), reads:
(73) Assignee: TOKUYAMA CORPORATION
Whereas it should read:
(73) Assignee: TOKUYAMA CORPORATION, Yamaguchi (JP)

Signed and Sealed this
Fourth Day of June, 2024

Katherine Kelly Vidal
*Director of the United States Patent and Trademark Office*